US012609625B2

(12) United States Patent
Li et al.

(10) Patent No.: US 12,609,625 B2
(45) Date of Patent: Apr. 21, 2026

(54) FULL-BRIDGE SERIES RESONANT CONVERTER

(71) Applicant: DELTA ELECTRONICS, INC., Taoyuan City (TW)

(72) Inventors: Sheng-Hua Li, Taoyuan City (TW); You-Si Lin, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 215 days.

(21) Appl. No.: 18/364,748

(22) Filed: Aug. 3, 2023

(65) Prior Publication Data

US 2024/0297591 A1 Sep. 5, 2024

(30) Foreign Application Priority Data

Mar. 2, 2023 (CN) .......................... 202310188556.7

(51) Int. Cl.
| | |
|---|---|
| *H02M 3/335* | (2006.01) |
| *H02M 1/00* | (2006.01) |
| *H02M 3/00* | (2006.01) |

(52) U.S. Cl.
CPC ..... *H02M 3/33573* (2021.05); *H02M 1/0025* (2021.05); *H02M 1/0058* (2021.05); *H02M 3/01* (2021.05)

(58) Field of Classification Search
CPC ........ H02M 3/01; H02M 3/005; H02M 3/015; H02M 3/33573; H02M 3/33576; H02M 3/33592; H02M 3/33546; H02M 3/33553; H02M 3/33561; H02M 1/0025; H02M 1/0003; H02M 1/0006; H02M 1/0058
See application file for complete search history.

(56) References Cited

U.S. PATENT DOCUMENTS

| | | | |
|---|---|---|---|
| 2018/0054133 A1* | 2/2018 | Moon | H02M 1/36 |
| 2019/0068071 A1 | 2/2019 | Jia et al. | |
| 2021/0028712 A1* | 1/2021 | Yu | H01F 30/16 |
| 2022/0166255 A1 | 5/2022 | Wu et al. | |

FOREIGN PATENT DOCUMENTS

| | | |
|---|---|---|
| TW | 202019070 A | 5/2020 |
| TW | I759972 B | 4/2022 |

OTHER PUBLICATIONS

Office Action dated Sep. 4, 2023 of the corresponding Taiwan patent application No. 112107565; pp. 1-6.

* cited by examiner

*Primary Examiner* — Nguyen Tran
(74) *Attorney, Agent, or Firm* — Muncy, Geissler, Olds & Lowe, P.C.

(57) ABSTRACT

A full-bridge series resonant converter includes a full-bridge switch circuit, a transformer, a resonant tank, a sensing circuit, and a processing circuit. The full-bridge switch circuit includes a first switch leg and a second switch leg having a second lower switch. The resonant tank includes a resonant inductor, a magnetizing inductor, and a resonant capacitor. The sensing circuit is coupled between the resonant capacitor and a ground point of a primary side of the transformer for sensing a node voltage between the resonant capacitor and the ground point as a sensing voltage. The processing circuit counts a turned-on time of the second lower switch as a first half-cycle time based on the sensing voltage, and duplicates the first half-cycle time as a second half-cycle time for controlling the full-bridge switch circuit.

13 Claims, 6 Drawing Sheets

FULL-BRIDGE SERIES RESONANT CONVERTER

BACKGROUND

Technical Field

The present disclosure relates to a resonant converter, and more particularly to a full-bridge series resonant converter.

Description of Related Art

The statements in this section merely provide background information related to the present disclosure and do not necessarily constitute prior art.

In the past ten years, the power industry has widely used series resonant converter (SRC) as a low-cost, high-efficiency isolated power stage. Especially the LLC series resonant converter (LLC-SRC), which has soft-switching characteristics and does not require complex control schemes. By using the soft-switching feature, components with lower rated voltage can be used, and high conversion efficiency can be provided. Only a simple control scheme is required, that is, variable frequency modulation with a fixed 50% duty cycle, and only requires a lower controller cost, which is more advantageous than other controller with soft-switching topology.

The integrated circuit (IC) for the charge control of the commercially available resonant converter is used in the half-bridge LLC. However, there is no application for the full-bridge LLC topology commonly used in high power.

Furthermore, in the traditional resonant circuit, if it is desired to be controlled by capturing/sampling the voltage at both ends of the resonant capacitor of the resonant tank shown in FIG. 1A, technical difficulties will be encountered. When the switch $Q_3$ shown in FIG. 1A is turned off, the voltage across the resonant capacitor (such as a capacitor voltage Vcr shown in FIG. 1A) is in a floating state, and therefore a differential isolated sensing circuit may be used to acquire the charge signal. However, under high-switching frequency applications, it is easy to be unable to accurately and dynamically realize charge control due to the low bandwidth of components.

SUMMARY

An object of the present disclosure is to provide a full-bridge series resonant converter to solve the problems of existing technology.

In order to achieve the above-mentioned objective, the full-bridge series resonant converter includes a full-bridge switch circuit, a transformer, a resonant tank, a sensing circuit, and a processing circuit. The full-bridge switch circuit includes a first switch leg and a second switch leg. The first switch leg includes a first upper switch and a first lower switch connected in series. The second switch leg includes a second upper switch and a second lower switch connected in series. The transformer includes a primary side. The resonant tank includes a resonant inductor, a magnetizing inductor of the transformer, and a resonant capacitor coupled in series. Two ends of the resonant tank are coupled between the first switch leg and the second switch leg. The sensing circuit is coupled between the resonant capacitor and a ground point of the primary side, and senses a node voltage between the resonant capacitor and the ground point as a sensing voltage. The processing circuit is coupled to the sensing circuit, and the processing circuit counts a turned-on time of the second lower switch as a first half-cycle time based on the sensing voltage, and duplicates the first half-cycle time as a second half-cycle time for controlling the full-bridge switch circuit.

Accordingly, by capturing the voltage waveform of the sensing voltage to the ground point at the moment of turning on the second lower switch and performing the counting operation, the resonant voltage in the resonant cycle can be acquired under a simplified circuit structure, and the single-band voltage command can be used as the control signal for the charge control.

Another object of the present disclosure is to provide a full-bridge series resonant converter to solve the problems of existing technology.

In order to achieve the above-mentioned objective, the full-bridge series resonant converter includes a full-bridge switch circuit, a transformer, a resonant tank, and a sensing circuit. The first switch leg includes a first upper switch and a first lower switch connected in series. The second switch leg includes a second upper switch and a second lower switch connected in series. The transformer includes a primary side. The resonant tank includes a resonant inductor, a magnetizing inductor of the transformer, a first resonant capacitor, and a second resonant capacitor. Two ends of the resonant tank are coupled between the first switch leg and the second switch leg. The sensing circuit is coupled between the first resonant capacitor and a ground point of the primary side, and between the second resonant capacitor and the ground point, and senses a first sensing voltage between the first resonant capacitor and the ground point and a turned-on time of the first sensing voltage is as a first half-cycle time, and senses a second sensing voltage between the second resonant capacitor and the ground point and a turned-on time of the second sensing voltage is as a second half-cycle time for controlling the full-bridge switch circuit.

Accordingly, by simultaneously turning on (and turning off) the second lower switch and the first switch, and simultaneously turning on (and turning off) the first lower switch and the second switch, the voltage waveform of the first node voltage to the ground point and the voltage waveform of the second node voltage to the ground point are respectively captured to be compared and processed so as to acquire the resonant voltage for a complete resonant cycle. Therefore, dual-band voltage commands are used as the control signals for the charge control, thereby speeding up the dynamic response speed of the charge control, and increasing the immediacy and accuracy.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1A:
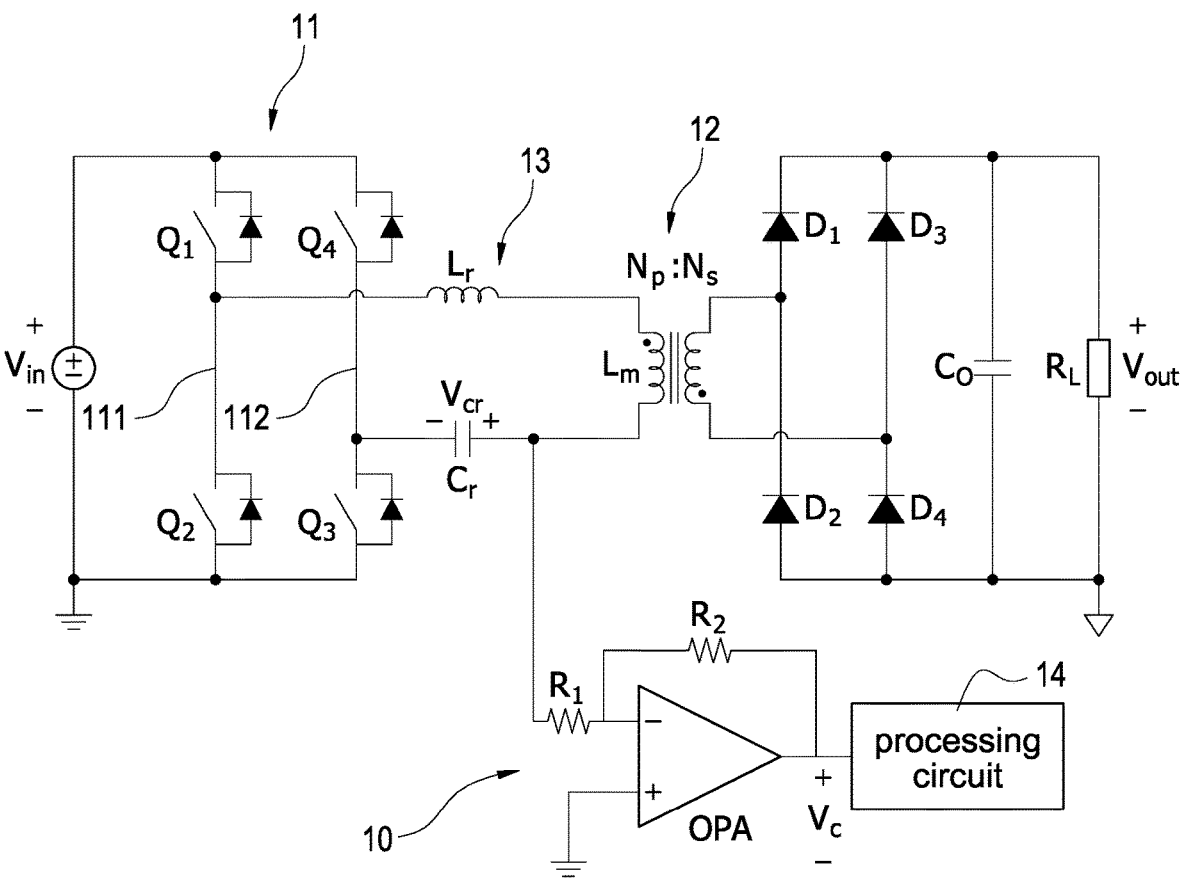
FIG. 1A is a circuit diagram of the full-bridge series resonant converter according to a first embodiment of the present disclosure.

Reference will now be made to the drawing figures to describe the present disclosure in detail. It will be understood that the drawing figures and exemplified embodiments of present disclosure are not limited to the details thereof.

Please refer to FIG. 1A, which shows a circuit diagram of the full-bridge series resonant converter according to a first embodiment of the present disclosure. The full-bridge series resonant converter includes a full-bridge switch circuit 11, a transformer 12, a resonant tank 13, a sensing circuit 10, and a processing circuit 14.

Figure 2:
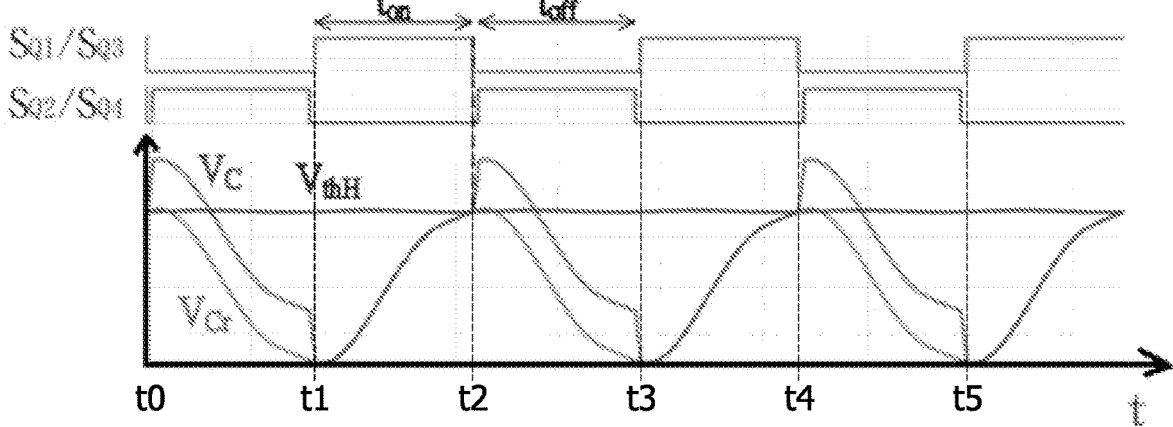
FIG. 2 is a schematic waveform of switch control and capacitor voltage according to the first embodiment of the present disclosure.

The full-bridge switch circuit 11 includes a first switch leg 111 and a second switch leg 112. The first switch leg 111 includes a first upper switch $Q_1$ and a first lower switch $Q_2$ connected in series. The second switch leg 112 includes a second upper switch $Q_4$ and a second lower switch $Q_3$ connected in series. The second lower switch $Q_3$ and the first upper switch $Q_1$ are controlled by a first control signal $S_{Q1}/S_{Q3}$. The second upper switch $Q_4$ and the first lower switch $Q_2$ are controlled by a second control signal $S_{Q2}/S_{Q4}$. In particular, first control signal $S_{Q1}/S_{Q3}$ is complementary in level to the second control signal $S_{Q2}/S_{Q4}$. The specific first control signal $S_{Q1}/S_{Q3}$ and the second control signal $S_{Q2}/S_{Q4}$ may be referred to as shown in FIG. 2.

The transformer 12 includes a primary side and a secondary side. In particular, the primary side has a primary-side winding, the secondary side has a secondary-side winding, and a turns ratio of between the primary-side winding and the secondary-side winding is Np:Ns.

The resonant tank 13 includes a resonant inductor Lr, a magnetizing inductor Lm of the primary-side winding of the transformer 12, and a resonant capacitor Cr coupled in series. Two ends of the resonant tank 13 are coupled between the first switch leg 111 and the second switch leg 112. Specifically, one end of the resonant tank 13 is coupled to a commonly-connected node of the first upper switch $Q_1$ and the first lower switch $Q_2$ of the first switch leg 111, and the other end of the resonant tank 13 is coupled to a commonly-connected node of the second upper switch $Q_4$ and the second lower switch $Q_3$ of the second switch leg 112.

The sensing circuit 10 is coupled between the resonant capacitor Cr and a ground point of the primary side, and senses an end voltage (i.e., a voltage at one end of the resonant capacitor Cr) as a sensing voltage Vc. In this embodiment, the sensing circuit 10 is coupled between a commonly-connected node, which is between the resonant capacitor Cr and the primary-side winding, and the ground point.

The processing circuit 14 is coupled to the sensing circuit 10. The processing circuit 14 receives the sensing voltage Vc provided by the sensing circuit, and counts a turned-on time of the second lower switch $Q_3$ as a first half-cycle time based on the sensing voltage Vc, and duplicates the first half-cycle time as a second half-cycle time for controlling the turning on and the turning off of the switches $Q_1$-$Q_4$ of the full-bridge switch circuit 11.

As shown in FIG. 1A, the sensing circuit 10 includes an operational amplifier OPA, a first resistor $R_1$, and a second resistor $R_2$. The operational amplifier OPA includes an inverting input end –, a non-inverting input end +, and an output end. One end of the first resistor $R_1$ is coupled to the inverting input end –, and the other end of the first resistor $R_1$ is coupled to the commonly-connected node of the resonant capacitor Cr and the primary-side winding. The second resistor $R_2$ is coupled to the inverting input end – and the output end. In particular, a resistance ratio value is between the second resistor $R_2$ and the first resistor $R_1$.

For example, if the second resistor $R_2$ is 5 ohms and the first resistor $R_1$ is 50 ohms, the resistance ratio value is 0.1. Therefore, the sensing circuit 10 converts the end voltage into the sensing voltage Vc based on the resistance ratio value. For example, if the resistance ratio value is 0.1, the sensing circuit 10 converts the end voltage of 20 volts into the sensing voltage Vc of 2 volts. In this embodiment, the sensing circuit 10 is a reverse amplifier circuit structure, and therefore there is a reverse (opposite positive and negative polarities) characteristic of the sensing voltage Vc and the node voltage. However, in the present disclosure, the sensing circuit 10 is not limited to the circuit structure of inverse amplification, that is, the sensing circuit 10 may also be implemented with a circuit structure of non-inverting amplification. As long as the sensing voltage Vc can be processed or calculated conveniently and accurately through the next-stage reverse circuit or through the design of software and firmware, it can also be included in the scope of the present disclosure.

Figure 1B:
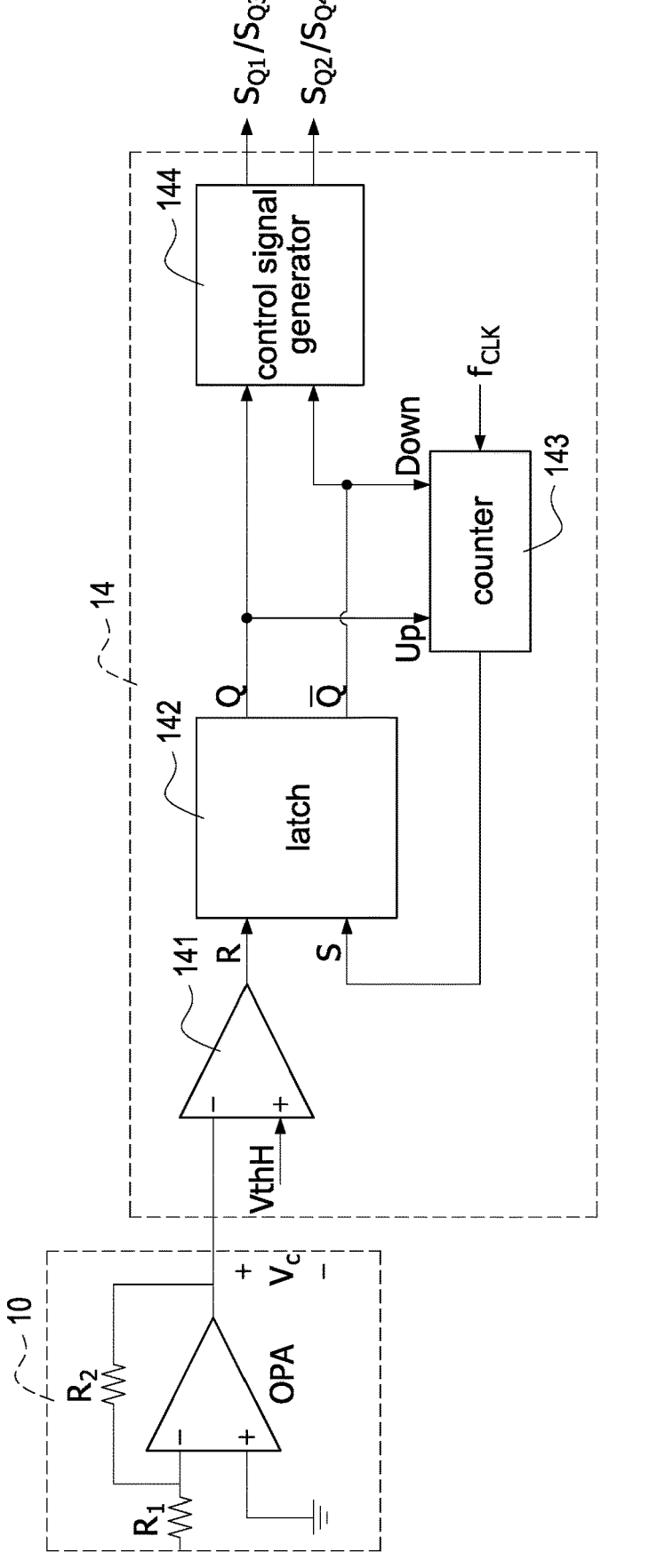
FIG. 1B is a detailed circuit diagram of a processing circuit of the full-bridge series resonant converter according to the first embodiment of the present disclosure.

Please refer to FIG. 1B, which shows a detailed circuit diagram of a processing circuit of the full-bridge series resonant converter according to the first embodiment of the present disclosure. The processing circuit 14 shown in FIG. 1B includes a comparator 141, a latch 142, a counter 143, and a control signal generator 144. However, this is not intended to limit the present disclosure, and those that can realize the functions of processing circuits or similar changes should be included in the scope of the present disclosure. In particular, the latch 142 may be implemented as an RS flip-flop (or referred to as RS latch). The specific operation of the processing circuit 14 will be described later.

Please refer to FIG. 2, which shows a schematic waveform of switch control and capacitor voltage according to the first embodiment of the present disclosure. As shown in FIG. 2, the waveform of the capacitor voltage is acquired by turning on and turning off switches by the first control signal $S_{Q1}/S_{Q3}$ and the second control signal $S_{Q2}/S_{Q4}$. In particular, the Vcr waveform is a voltage waveform between the commonly-connected node of the resonant capacitor Cr and the primary-side winding and the ground point.

However, since the second lower switch $Q_3$ is in a state where the voltage across two ends of the resonant capacitor Cr is floating when the second lower switch $Q_3$ is turned off, and therefore the phenomenon that the waveform of the sensing voltage Vc sensed by the sensing circuit 10 occurs voltage offset. Such a phenomenon may be clearly seen from time t0 to time t1, time t2 to time t3, and time t4 to time t5 in FIG. 2.

Although such a phenomenon occurs in this embodiment, the purpose of charge control can still be achieved through detection and determination, and the method is as follows. The processing circuit 14 counts a turned-on time of the second lower switch $Q_3$, that is, when the second lower switch $Q_3$ is turned on, the processing circuit 14 starts to count the sensing voltage Vc until the sensing voltage Vc reaches the upper limit voltage value VthH, and the second lower switch $Q_3$ is turned off. Therefore, it is possible to count the complete turned-on time between the turning on and the turning off of the second lower switch $Q_3$ (that is, the time period ton or time t1 to time t2 shown in FIG. 2, or the time when the Vc waveform overlaps the Vcr waveform), and the turned-on time is taken as the first half-cycle time.

As show in FIG. 1B, when the second lower switch $Q_3$ is turned on at time t1, the sensing voltage Vc is compared with the upper limit voltage value VthH by the comparator 141. In particular, the upper limit voltage value VthH is a voltage command value related to load conditions. When the conduction starts, the sensing voltage Vc is lower than the upper limit voltage value VthH so the output of the comparator 141 is high-level. Since the output of the comparator 141 is high-level, the input at an R-input end of the latch 142 (for example, the RS flip-flop) is high-level. In this condition, the counter 143 starts performing an up counting, and the first control signal $S_{Q1}/S_{Q3}$ keeps turned-on condition and the second control signal $S_{Q2}/S_{Q4}$ keeps turned-off condition. Until the sensing voltage Vc reaches the upper limit voltage value VthH, the output of the comparator 141 changes to be low-level, and therefore the R-input end of the latch 142 is low-level. In this condition, the counter 143 starts performing a down counting, and the first control signal $S_{Q1}/S_{Q3}$ changes to be turned-off condition so as to control the second control signal $S_{Q2}/S_{Q4}$ changing to be turned-on condition. Therefore, by counting down to the initial value at which the counter 143 starts counting up, the processing circuit 14 can duplicate the first half-cycle time as the second half-cycle time, thereby acquiring the first half-cycle time and the second half-cycle time (that is, a complete switching cycle) of the same turned-on time of 50% for controlling the turning on and the turning off of the switches $Q_1$-$Q_4$ of the full-bridge switch circuit.

In this embodiment, counting down can also be activated, until the sensing voltage Vc reaches the upper limit voltage value VthH, and then switch to counting up, which can also duplicate the first half-cycle time as the second half-cycle time.

In the first embodiment, by capturing the voltage waveform of the sensing voltage Vc, i.e., the end voltage to the ground point at the moment of turning on the second lower switch $Q_3$ and performing the counting operation by the processing circuit 14, the resonant voltage in the resonant cycle can be acquired under a simplified circuit structure, and the single-band voltage command, i.e., the upper limit voltage value VthH can be used as the control signal for the charge control.

Figure 3A:
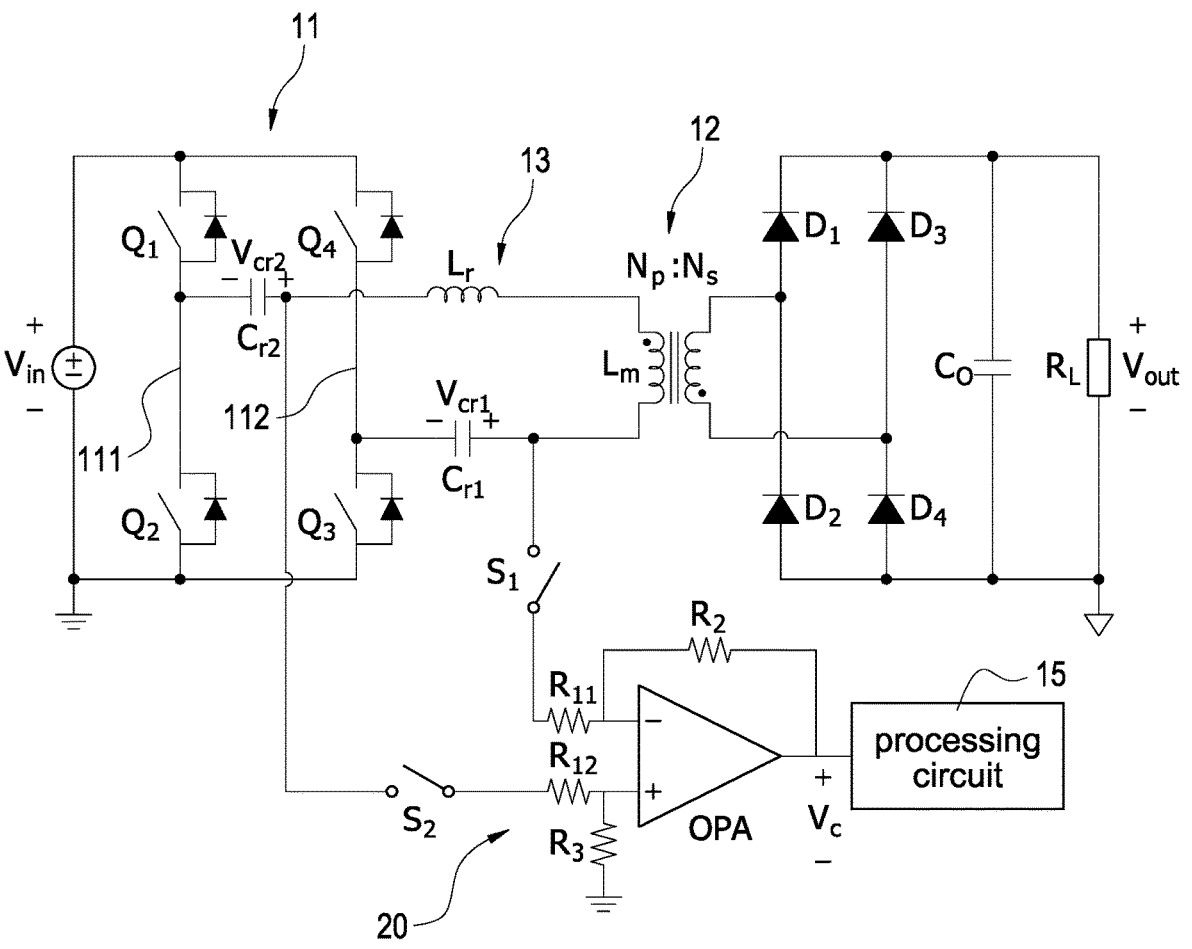
FIG. 3A is a circuit diagram of the full-bridge series resonant converter according to a second embodiment of the present disclosure.

Please refer to FIG. 3A, which shows a circuit diagram of the full-bridge series resonant converter according to a second embodiment of the present disclosure. The full-bridge series resonant converter includes a full-bridge switch circuit 11, a transformer 12, a resonant 13, and a sensing circuit 20.

Figure 4:
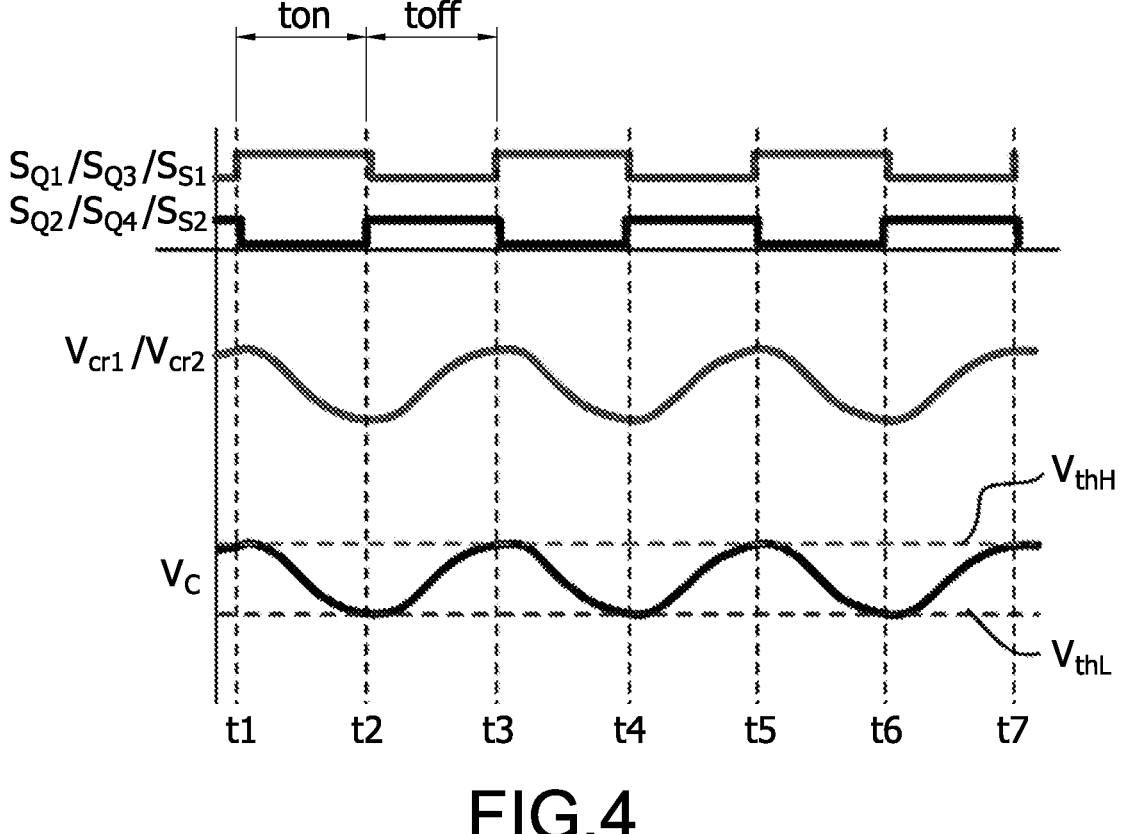
FIG. 4 is a schematic waveform of switch control and capacitor voltage according to the second embodiment of the present disclosure.

The full-bridge switch circuit 11 includes a first switch leg 111 and a second switch leg 112. The first switch leg 111 includes a first upper switch $Q_1$ and a first lower switch $Q_2$ connected in series. The second switch leg 112 includes a second upper switch $Q_4$ and a second lower switch $Q_3$ connected in series. The second lower switch $Q_3$ and the first upper switch $Q_1$ are controlled by a first control signal $S_{Q1}/S_{Q3}$. The second upper switch $Q_4$ and the first lower switch $Q_2$ are controlled by a second control signal $S_{Q2}/S_{Q4}$. In particular, first control signal $S_{Q1}/S_{Q3}$ is complementary in level to the second control signal $S_{Q2}/S_{Q4}$. The specific first control signal $S_{Q1}/S_{Q3}$ and the second control signal $S_{Q2}/S_{Q4}$ may be referred to as shown in FIG. 4.

The transformer 12 includes a primary side and a secondary side. In particular, the primary side has a primary-side winding, the secondary side has a secondary-side winding, and a turns ratio of between the primary-side winding and the secondary-side winding is Np:Ns.

The resonant tank 13 includes a resonant inductor Lr, a magnetizing inductor Lm of the primary-side winding of the transformer 12, a first resonant capacitor Cr1, and a second resonant capacitor Cr2. Two ends of the resonant tank 13 are coupled between the first switch leg 111 and the second switch leg 112.

The sensing circuit 20 is coupled between the first resonant capacitor Cr1 and a ground point of the primary side, and between the second resonant capacitor Cr2 and the ground point, and senses a first end voltage (i.e., a voltage at one end of the first resonant capacitor Cr1, and the end is the commonly-connected node of the first resonant capacitor Cr1 and the primary-side winding) and a turned-on time of the first end voltage is as a first half-cycle time. The sensing circuit 20 further senses a second end voltage (i.e., a voltage at one end of the second resonant capacitor Cr2, and the end is the commonly-connected node of the second resonant capacitor Cr2 and the primary-side winding) and a turned-on time of the second end voltage is as a second half-cycle time. Therefore, the first half-cycle time and the second half-cycle time are used to control the full-bridge switch circuit 11.

In comparison with the single resonant capacitor Cr in the first embodiment, the second embodiment uses the first resonant capacitor Cr1 and the second resonant capacitor Cr2. The first resonant capacitor Cr1 is arranged between one end of the primary-side winding of the transformer 12 and the second switch leg 112, and the second resonant capacitor Cr2 is arranged between the other end of the primary-side winding of the transformer 12 and the first switch leg 111.

As shown in FIG. 3A, the sensing circuit 20 includes an operational amplifier OPA, a first input resistor $R_{11}$, a second input resistor $R_{12}$, a second resistor $R_2$, a third resistor $R_3$, a first switch $S_1$, and a second switch $S_2$. The operational amplifier OPA includes an inverting input end −, a non-inverting input end +, and an output end. A first end of the first input resistor $R_{11}$ is coupled to the inverting input end −, a second end of the first input resistor $R_{11}$ is coupled to the first switch $S_1$, and the first input resistor $R_{11}$ is coupled to a commonly-connected node of the first resonant capacitor Cr1 and the primary-side winding through the first switch $S_1$. A first end of the second input resistor $R_{12}$ is coupled to the non-inverting input end +, a second end of the second input resistor $R_{12}$ is coupled to the second switch $S_2$, and the second input resistor $R_{12}$ is coupled to a commonly-connected node of the second resonant capacitor Cr2 and the primary-side winding through the second switch $S_2$.

In this embodiment, the sensing circuit 20 is a differential amplifier circuit structure, and therefore the first end voltage of the first resonant capacitor Cr1 and the second end voltage of the second resonant capacitor Cr2 can be acquired by turning on and turning off the first switch $S_1$ and the second switch $S_2$.

Figure 3B:
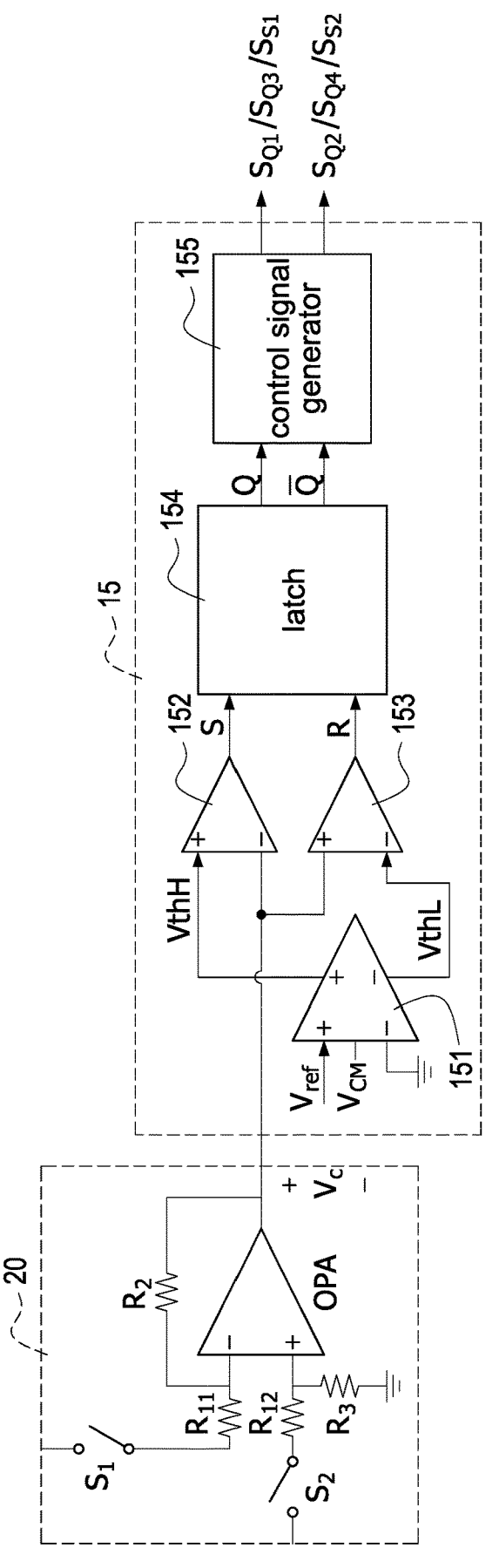
FIG. 3B is a detailed circuit diagram of a processing circuit of the full-bridge series resonant converter according to the second embodiment of the present disclosure.

Please refer to FIG. 3B, which shows a detailed circuit diagram of a processing circuit of the full-bridge series resonant converter according to the second embodiment of the present disclosure. In FIG. 3B, it will be described how to acquire the resonant voltage of a complete resonant cycle through the upper and lower limit voltage commands (i.e., the upper limit voltage value VthH and the lower limit voltage value VthL). In this embodiment, the full-bridge series resonant converter further includes a processing circuit 15. The processing circuit 15 is coupled to the sensing circuit 20. The processing circuit 15 includes a voltage command generator 151, a first comparator 152, a second comparator 153, a latch 154, and a control signal generator 155.

The voltage command generator 151 generates an upper limit voltage value VthH and a lower limit voltage value VthL. The comparator 152 receives the upper limit voltage value VthH and an output voltage of the sending circuit 20. Similarly, the second comparator 153 receives the lower limit voltage value VthL and the output voltage of the sensing circuit 20. In particular, the output voltage is the first end voltage or the second end voltage. The upper limit voltage value VthH and the lower limit voltage value VthL are voltage command values related to load conditions. The upper limit voltage value VthH is greater than the output voltage of the sensing circuit 20, and the lower limit voltage value VthL is less than the output voltage of the sensing circuit 20.

Specifically, refer to FIG. 4, at the beginning of the first half cycle (i.e., at time t1), that is, when the second lower switch $Q_3$ is turned on, the first switch $S_1$ is turned on by a first switch signal $S_{S1}$, and the second switch $S_2$ is turned off by a second switch signal $S_{S2}$, and therefore a first node voltage is received at the inverting input end – of the sensing circuit 20. Since the first node voltage is less than the upper limit voltage value VthH and the first node voltage is greater than the lower limit voltage value VthL, the output of the first comparator 152 is high-level and the output of the second comparator 153 is high-level, and therefore the input at an S-input end and the input at an R-input end of the latch 154 are both high-level. In this condition, the first control signal $S_{Q1}/S_{Q3}$ and the first switch signal $S_{S1}$ keep turned-on condition, and the second control signal $S_{Q2}/S_{Q4}$ and the second switch signal $S_{S2}$ keep turned-off condition. Until the first node voltage decreases to reach the lower limit voltage value VthL, the output of the second comparator 153 is changed to be low-level, and therefore the input at the R-input end of the latch 154 is low-level. In this condition, the second control signal $S_{Q2}/S_{Q4}$ and the second switch signal $S_{S2}$ change to be turned-on condition so as to control the first control signal $S_{Q1}/S_{Q3}$ and the first switch signal $S_{S1}$ changing to be turned-off condition.

Similarly, at the beginning of the second half cycle (i.e., at time t2), that is, when the first lower switch $Q_2$ is turned on, the second switch $S_2$ is turned on by a second switch signal $S_{S2}$, and the first switch $S_1$ is turned off by a first switch signal $S_{S1}$, and therefore a second node voltage is received at the non-inverting input end + of the sensing circuit 20. Since the second node voltage gradually increases, the output of the second comparator 153 is high-level and the output of the first comparator 152 is high-level, and therefore the input at an S-input end and the input at an R-input end of the latch 154 are both high-level. In this condition, the second control signal $S_{Q2}/S_{Q4}$ and the second switch signal $S_{S2}$ keep turned-on condition, and the first control signal $S_{Q1}/S_{Q3}$ and the first switch signal $S_{S1}$ keep turned-off condition. Until the second node voltage increases to reach the upper limit voltage value VthH (i.e., at time t3), the output of the first comparator 152 is changed to be low-level, and therefore the input at the S-input end of the latch 154 is low-level. In this condition, the first control signal $S_{Q1}/S_{Q3}$ and the first switch signal $S_{S1}$ change to be turned-on condition so as to control the second control signal $S_{Q2}/S_{Q4}$ and the second switch signal $S_{S2}$ changing to be turned-off condition. Accordingly, the first node voltage and the second node voltage are compared and processed by the processing circuit 15 to acquire a complete voltage waveform of the resonant tank 13.

In the second embodiment, by simultaneously turning on (and turning off) the second lower switch $Q_3$ and the first switch $S_1$, and simultaneously turning on (and turning off) the first lower switch $Q_2$ and the second switch $S_2$, the voltage waveform of the first node voltage to the ground point and the voltage waveform of the second node voltage to the ground point are respectively captured to be compared and processed so as to acquire the resonant voltage for a complete resonant cycle. Therefore, dual-band voltage commands (i.e., upper limit voltage value VthH and the lower limit voltage value VthL) are used as the control signals for the charge control, thereby speeding up the dynamic response speed of the charge control, and increasing the immediacy and accuracy.

Incidentally, in the second embodiment of the present disclosure, although the dual-band voltage commands, i.e., the upper limit voltage value VthH and the lower limit voltage value VthL, are used to acquire the resonant voltage of the complete resonant cycle, in this embodiment, the upper limit voltage value VthH may also be used, and combined with the operation of the processing circuit so that the aforementioned first embodiment can also be realized by duplicating the first half-cycle time as the second half-cycle time for controlling the turning on and the turning off of the switches $Q_1$-$Q_4$ of the full-bridge switch circuit.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A full-bridge series resonant converter, comprising:
a full-bridge switch circuit, comprising:
a first switch leg, comprising a first upper switch and a first lower switch connected in series,
a second switch leg, comprising a second upper switch and a second lower switch connected in series,
a transformer, comprising a primary side,
a resonant tank, comprising a resonant inductor, a magnetizing inductor of the transformer, and a resonant capacitor coupled in series; wherein two ends of the resonant tank are coupled between the first switch leg and the second switch leg,
a sensing circuit, coupled between the resonant capacitor and a ground point of the primary side, and configured to sense a node voltage between the resonant capacitor and the ground point as a sensing voltage, and
a processing circuit, coupled to the sensing circuit, and the processing circuit configured to count a turned-on time of the second lower switch as a first half-cycle time based on the sensing voltage, and duplicate the first half-cycle time as a second half-cycle time for controlling the full-bridge switch circuit,
wherein the second lower switch and the first upper switch are controlled by a first control signal corresponding to the first half-cycle time, and the second upper switch and the first lower switch are controlled by a second control signal corresponding to the second half-cycle time; wherein the first control signal is complementary in level to the second control signal.

2. The full-bridge series resonant converter as claimed in claim 1, wherein the primary side comprises a primary-side winding, and the sensing circuit is coupled between a commonly-connected node, which is between the resonant capacitor and the primary-side winding, and the ground point.

3. The full-bridge series resonant converter as claimed in claim 1, wherein the sensing circuit is an inverting amplifier circuit.

4. The full-bridge series resonant converter as claimed in claim 3, wherein the sensing circuit comprises:

an operational amplifier, comprising an inverting input end, a non-inverting input end, and an output end, a first resistor, coupled to the inverting input end, and a second resistor, coupled to the inverting input end and the output end; wherein a resistance ratio value is between the second resistor and the first resistor, wherein the sensing circuit is configured to convert the node voltage into the sensing voltage based on the resistance ratio value.

5. The full-bridge series resonant converter as claimed in claim 1, wherein when the second lower switch is turned on, the processing circuit starts to count the sensing voltage; until the sensing voltage reaches an upper limit voltage value, the second lower switch is turned off to acquire the first half-cycle time.

6. The full-bridge series resonant converter as claimed in claim 1, wherein the processing circuit comprising:

a comparator, configured to receive the sensing voltage and an upper limit voltage value, and compare the sensing voltage with the upper limit voltage value to output a level signal, a latch, configured to receive the level signal and provide a counting signal, a counter, configured to receive the counting signal and perform an up counting or a down counting based on the counting signal, and a control signal generator, coupled to the latch and the counter, and the control signal generator configured to generate control signals of controlling the first upper switch, the first lower switch, the second upper switch, and the second lower switch.

7. A full-bridge series resonant converter, comprising:

a full-bridge switch circuit, comprising:

a first switch leg, comprising a first upper switch and a first lower switch connected in series, a second switch leg, comprising a second upper switch and a second lower switch connected in series, a transformer, comprising a primary side, a resonant tank, comprising a resonant inductor, a magnetizing inductor of the transformer, a first resonant capacitor, and a second resonant capacitor; wherein two ends of the resonant tank are coupled between the first switch leg and the second switch leg, and a sensing circuit, coupled between the first resonant capacitor and a ground point of the primary side, and between the second resonant capacitor and the ground point, and configured to sense a first sensing voltage between the first resonant capacitor and the ground point and a turned-on time of the first sensing voltage being as a first half-cycle time, and configured to sense a second sensing voltage between the second resonant capacitor and the ground point and a turned-on time of the second sensing voltage being as a second half-cycle time for controlling the full-bridge switch circuit wherein the second lower switch and the first upper switch are controlled by a first control signal corresponding to the first half-cycle time, and the second upper switch and the first lower switch are controlled by a second control signal corresponding to the second half-cycle time; wherein the first control signal is complementary in level to the second control signal.

8. The full-bridge series resonant converter as claimed in claim 7, wherein the primary side comprises a primary-side winding, and the sensing circuit is coupled to a commonly-connected node between the first resonant capacitor and the primary-side winding, and coupled to a commonly-connected node between the second resonant capacitor and the primary-side winding.

9. The full-bridge series resonant converter as claimed in claim 7, wherein the sensing circuit is a differential amplifier circuit.

10. The full-bridge series resonant converter as claimed in claim 9, wherein the sensing circuit comprises:

an operational amplifier, comprising an inverting input end, a non-inverting input end, and an output end, a first switch and a second switch, a first input resistor, a first end of the first input resistor coupled to the inverting input end, a second end of the first input resistor coupled to the first switch, and the first input resistor coupled to the first resonant capacitor and the primary side through the first switch, and a second input resistor, a first end of the second input resistor coupled to the non-inverting input end, a second end of the second input resistor coupled to the second switch, and the second input resistor coupled to the second resonant capacitor and the primary side through the second switch.

11. The full-bridge series resonant converter as claimed in claim 10, wherein when the second lower switch is turned on, the first switch is turned on and the second switch is turned off, and the sensing circuit receives the first sensing voltage to acquire the first half-cycle time; when the first lower switch is turned on, the second switch is turned on and the first switch is turned off, and the sensing circuit receives the second sensing voltage to acquire the second half-cycle time.

12. The full-bridge series resonant converter as claimed in claim 7, further comprising:

a processing circuit, coupled to the sensing circuit, and the processing circuit comprising:

a voltage command generator, configured to generate an upper limit voltage value and a lower limit voltage value, a first comparator, configured to receive the first sensing voltage or the second sensing voltage and the upper limit voltage value, and compare the first sensing voltage or the second sensing voltage with the upper limit voltage value to output a first level signal, a second comparator, configured to receive the first sensing voltage or the second sensing voltage and the lower limit voltage value, and compare the first sensing voltage or the second sensing voltage with the lower limit voltage value to output a second level signal, a latch, configured to receive the first level signal and the second level signal, and provide a switch control signal, and a control signal generator, coupled to the latch, and the control signal generator configured to generate control signals of controlling the first upper switch, the first lower switch, the second upper switch, and the second lower switch.

13. The full-bridge series resonant converter as claimed in claim 7, further comprising:

a processing circuit, coupled to the sensing circuit, and the processing circuit comprising:

a voltage command generator, configured to generate an upper limit voltage value and a lower limit voltage value, a comparator, configured to receive the sensing voltage and the upper limit voltage value or the lower limit voltage value, and compare the sensing voltage and the upper limit voltage value or the lower limit voltage value to output a level signal, a latch, configured to receive the level signal and provide a counting signal, a counter, configured to receive the counting signal and perform an up counting or a down counting based on the counting signal, and a control signal generator, coupled to the latch and the counter, and the control signal generator configured to generate control signals of controlling the first upper switch, the first lower switch, the second upper switch, and the second lower switch.

\* \* \* \* \*